W. L. NEEDHAM.

Improvement in Speed-Signals for Railroad Trains.

No. 123,284.                      Patented Jan. 30, 1872.

WITNESSES.                  INVENTOR.

UNITED STATES PATENT OFFICE.

WILLIAM L. NEEDHAM, OF CLEVELAND, OHIO.

IMPROVEMENT IN SPEED-SIGNALS FOR RAILROAD TRAINS.

Specification forming part of Letters Patent No. 123,284, dated January 30, 1872.

SPECIFICATION.

I, WILLIAM L. NEEDHAM, of Cleveland, county of Cuyahoga and State of Ohio, have invented a new and Improved Speed-Signal for Railway Trains, of which the following is a specification:

The nature of this invention relates to the combination and arrangement of devices underneath the body of a railway car, to be connected with and operated by the axle of the car or truck, the said devices to be connected with and to operate lantern-signals on the top of the car, the same being constructed and operating as herein described.

Figure 1:
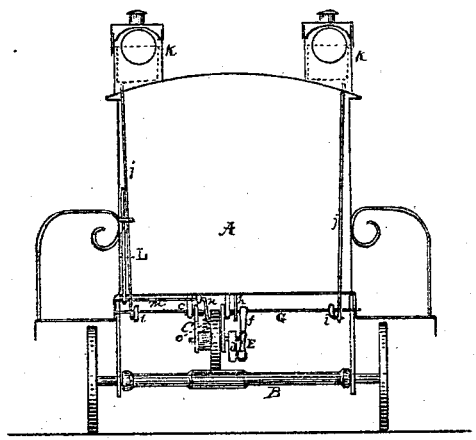
Figure 2:
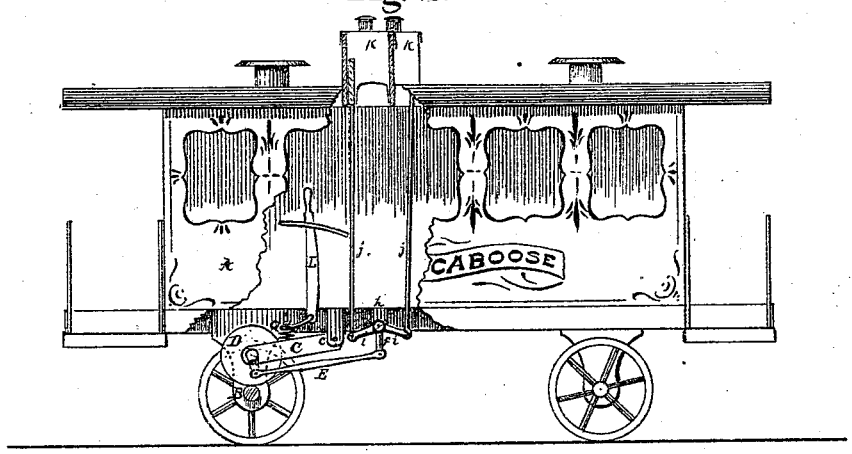

In the accompanying drawing, Figure 1 is an end view of a railway car having my improved signal devices attached, the end of the car being open. Fig. 2 is a side view of the same, having a portion of the side broken out to show the signal devices.

A represents the body of a car; B, the axle of the car or truck. Suspended underneath the body of the car, by a bracket, c, is a frame, C, in which is placed a wheel, D, turning on a shaft having its bearings in the frame C, and gearing with or coming in contact with the axle, said wheel being rotated by the axle. To the shaft of the wheel D is attached a crank, d, which is connected, by a pitman, E, to the crank f on a rock-shaft, G, said rock-shaft being supported by brackets h secured on the under side of the frame-work of the car, the rock-shaft extending crosswise of the car and having near the ends two opposite arms, i i. Passing up to the roof of the car are two rods, j j, connected with the two arms i i, the rods having an alternate up-and-down motion. Upon the top of the car are two lanterns, K K, situated at the sides and over the rods j j. The lanterns have each a clear white light of glass, one on the front and one on the rear side, or opposite each other. Attached to the top ends of the rods j j are frames having plates of red or colored glass or other substance in them, which, by the alternate motion of the rock-shaft G, carry the plate up and down before the lamps in the lanterns, by which an alternate white or colored light is displayed. The rapidity of motion of the changing signal thus made indicates the speed of the train. A lever, L, is placed inside of the car and is connected to a short rock-shaft, m, under the car, having an arm, n, bearing on a spring, o, for the purpose of causing the wheel D to bear upon the axle, more or less, as may be desired, and also to raise the frame C entirely from the axle, if desired.

The whole frame-work and its accompanying devices may be attached to the car independently of the truck.

Motion being imparted to the wheel D by the axle B, it will be seen that the rapidity with which the wheels of the car revolve a corresponding motion will be given to the signal, and by knowing the number of revolutions the wheels would make in a given distance the speed of the train can be readily ascertained by the rapidity of motion given to the signal-light. By this means an engineer of a following train may readily calculate the speed of the first train and govern the speed of his train accordingly. Or if the rear part of a train should become detached, the men on the front part can determine whether the rear part is stopped or still under control.

Having thus described my invention, I claim—

1. The frame C, wheel D, crank d, pitman E, and the rock-shaft G with its arms i i and crank f, in combination with the axle B of the car, substantially as described, and for the purpose set forth.

2. In combination with the rock-shaft G and the aforesaid accompanied devices, the rods j j and the frames and plates operating in the lanterns K K, substantially as shown and described, and for the purpose set forth.

WM. L. NEEDHAM.

Witnesses:
D. STEPHAN,
G. WEEVER.